April 30, 1929.  B. W. TWYMAN  1,710,905
COWL VENTILATOR MOUNTING FOR FLEXIBLE BODIES
Filed July 23, 1928
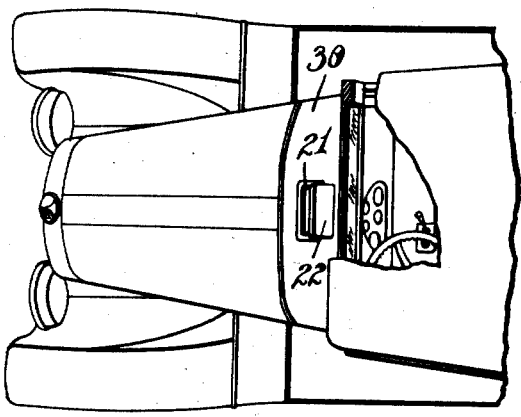
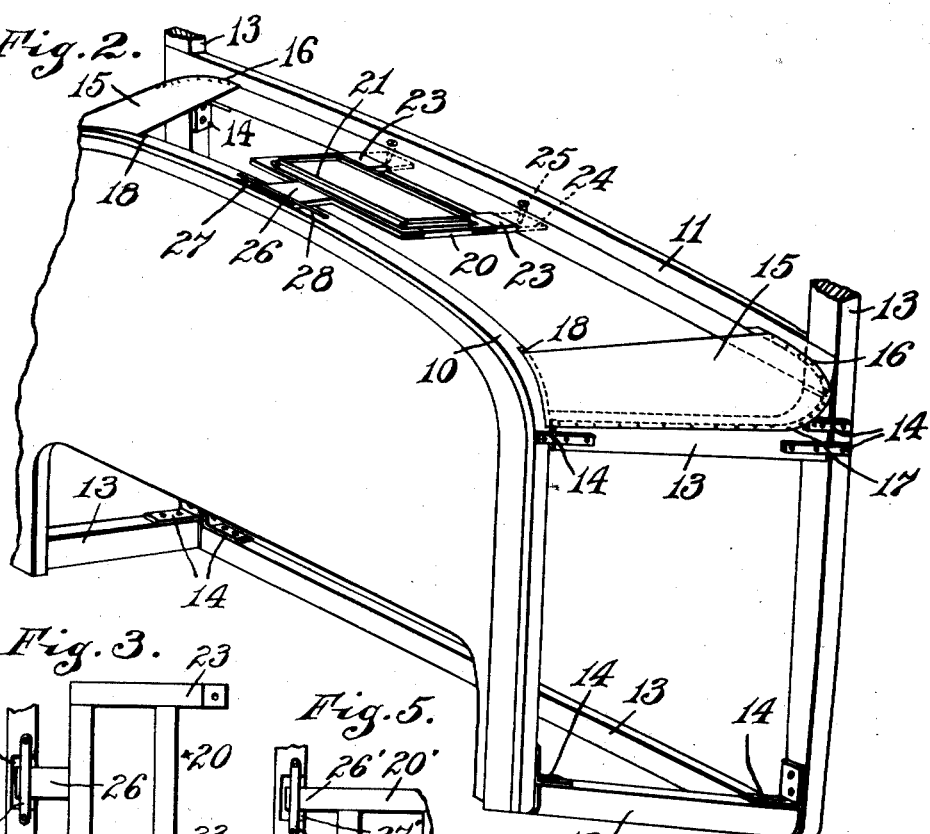
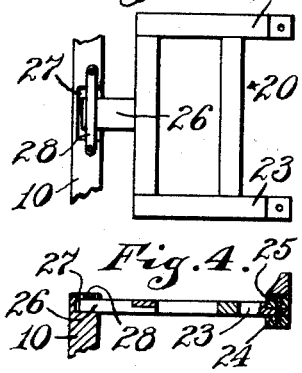
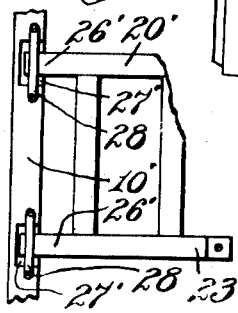
INVENTOR.
B. Wickliffe Twyman,
BY
Hood + Hahn
ATTORNEYS Patented Apr. 30, 1929.

1,710,905

UNITED STATES PATENT OFFICE.

B. WICKLIFFE TWYMAN, OF INDIANAPOLIS, INDIANA.

COWL-VENTILATOR MOUNTING FOR FLEXIBLE BODIES.

Application filed July 23, 1928. Serial No. 294,872.

In that type of sound-deadened closed bodies for automobiles wherein the body is composed of a skeleton frame the elements of which are so connected that the skeleton may weave and yield to the distortions of the supporting chassis frame and this skeleton is covered by a flexible covering of non-resonant fabric or other similar material.

The object of my present invention is to provide a cowl ventilating means of such character as to be capable of incorporation with such a flexible body structure.

The accompanying drawings illustrate my invention.

Fig. 1 is a plan of the front end of an automobile the body of which is a flexible skeleton fabric covered structure in the cowl of which my improvement has been incorporated;

Fig. 2 is a perspective of the flexible skeleton cowl with my improved ventilator in place, the fabric covering being omitted;

Fig. 3 is a plan of the ventilating frame and forward support therefor;

Fig. 4 a longitudinal section on the scale of Fig. 3 and

Fig. 5 a plan of a modified form of ventilator supporting frame.

In the drawings 10 and 11 indicate the front and rear bars of a flexible cowl skeleton, said parts being flexibly associated with their frame members 13 in such manner that they do not directly abut each other but have their adjacent portions slightly separated and connected by light flexible metal connected members 14, the construction being such that the skeleton frame may weave or yield to the distortions of the supporting chassis frame. It has been found advisable in cowl constructions of this kind to provide upper corner elements 15 of thin metal plate secured to elements of the flexible cowl frame, along two edges only, as indicated at 16 and 17, the front edges, generally, of the plates 15 being slidably supported in notches 18 in the upper corners of the front bar 10.

My ventilator support comprises a horizontal frame 20 upon which is mounted conveniently a metal frame 21 of angular cross section over which a ventilator cover 22 may fit in a well known manner. The frame 20 is provided, most conveniently at its rear edge, with extensions 23, 23 which are projected into mortises 24 in the rear bar 11 and secured by fastening screws 25. At the opposite side frame 20 is provided with a tongue 26 adapted to lie in a notch 27 in the upper surface of front bar 10 and held against vertical displacement by a bar 28 the upper surface of which is preferably flush with the upper surface of front bar 10 the arrangement being such that a covering fabric 30 (Fig. 1) may be stretched over the cowl frame and secured along its edges to the flexibly connected cowl frame elements 10, 11 and 13. This fabric covering will be provided with an opening appropriate to the opening through the frame 21 and, around the edges of this opening will be secured to the ventilator supporting frame 20.

It will be noted that the supporting frame 20 is so associated with the front and rear bars 10 and 11 that those bars may weave relative to each other, the flexibility of the covering 30 permitting this weaving without rupture of the cover.

While I believe that a three point support for the cowl supporting frame 20, as shown in Figs. 2 to 4, is preferable, it will be readily understood that modifications may be made without departing from my invention, as for instance, as shown in Fig. 5 where the ventilator supporting frame 20' is provided with two extensions 26' each of which lies in a notch 27' in the associated frame element 10' and is held against vertical displacement by bridge bar 28.

I claim as my invention:

The combination with flexibly connected cowl-skeleton elements of an automobile body, of a ventilator supporting frame mounted to form a bridge between two of such flexibly connected cowl forming elements, said ventilator supporting frame having portions overlapping the cowl skeleton, one overlapping association of ventilator support and cowl skeleton being slidably in one plane, and means for preventing separation of said overlapping association at right angles to the sliding plane, and a flexible covering connected to said cowl skeleton elements and the ventilator support.

In witness whereof, I, B. WICKLIFFE TWYMAN, have hereunto set my hand at Indianapolis, Indiana, this 20th day of July, A. D. one thousand nine hundred and twenty-eight.

B. WICKLIFFE TWYMAN.